US009863809B2

(12) United States Patent
Kuo et al.

(10) Patent No.: US 9,863,809 B2
(45) Date of Patent: Jan. 9, 2018

(54) SPECTROGRAPH (71) Applicant: Mettler-Toledo AG, Greifensee (CH)

(72) Inventors: Chun-Hung Kuo, Alexandria, VA (US);
Robert Kovich, West River, MD (US);
Tomasz Pol, Severna Park, MD (US);
Mario Crevatin, Winterthur (CH)

(73) Assignee: METTLER-TOLEDO GMBH,
Greifensee (CH)

( * ) Notice: Subject to any disclaimer, the term of this patent is extended or adjusted under 35 U.S.C. 154(b) by 199 days.

(21) Appl. No.: 14/840,537

(22) Filed: Aug. 31, 2015

(65) Prior Publication Data
US 2017/0059404 A1 Mar. 2, 2017

(51) Int. Cl.
*G01J 3/28* (2006.01)
*G01J 3/02* (2006.01)
*G01J 3/04* (2006.01)
*G01J 3/18* (2006.01)

(52) U.S. Cl.
CPC ........... *G01J 3/0229* (2013.01); *G01J 3/0202* (2013.01); *G01J 3/0218* (2013.01); *G01J 3/0221* (2013.01); *G01J 3/0291* (2013.01); *G01J 3/04* (2013.01); *G01J 3/18* (2013.01); *G01J 3/2803* (2013.01)

(58) Field of Classification Search
CPC ...... G01J 3/0229; G01J 3/0202; G01J 3/0218; G01J 3/0221; G01J 3/0291; G01J 3/04; G01J 3/18; G01J 3/2803
USPC ........................................................ 356/326
See application file for complete search history.

(56) References Cited

U.S. PATENT DOCUMENTS

| 5,042,893 A | 8/1991 | Ong |
| 6,320,663 B1 | 11/2001 | Ershov |
| 2003/0107733 A1 | 6/2003 | Oka et al. |
| 2007/0252989 A1 | 11/2007 | Comstock |
| 2008/0246962 A1 | 10/2008 | Yang |

(Continued)

FOREIGN PATENT DOCUMENTS

DE 102010015641 A1 10/2011

OTHER PUBLICATIONS

International Preliminary Report on Patentability and Written Opinion of the International Searching Authority (Forms PCT/ISA/220, PCT/ISA/210 and PCT/ISA/237) dated Oct. 28, 2016, by the International Bureau of WIPO, in corresponding International Application No. PCT/EP2016/063606. (18 pages).

*Primary Examiner* — Hina F Ayub
(74) *Attorney, Agent, or Firm* — Buchanan Ingersoll & Rooney PC (57) ABSTRACT

A spectrograph as disclosed includes a housing, wherein a wall of the housing includes first, second and third openings, an entrance slit located at the first opening and configured to direct light along a first light path portion in the interior of the housing, a dispersive element located at the second opening and configured to receive light from the entrance slit along the first light path portion and direct light along a second light path portion in the interior of the housing, a detector located at the third opening and configured to receive light from the dispersive element along the second light path portion. The detector can include first and second groups of light-sensitive regions. A cover can be positioned to separate the first group of light-sensitive regions from the light path, the second group of light-sensitive regions being exposed to the light path.

20 Claims, 5 Drawing Sheets

(56) References Cited

U.S. PATENT DOCUMENTS

| | | |
|---|---|---|
| 2011/0011897 A1 | 1/2011 | Bellmore et al. |
| 2011/0222056 A1 | 9/2011 | Seo et al. |
| 2012/0002202 A1* | 1/2012 | Chrisp .................. G01J 3/0208 356/328 |
| 2014/0063497 A1* | 3/2014 | Sano ........................ G01J 3/18 356/326 |
| 2017/0030773 A1* | 2/2017 | Han ...................... G01J 3/0208 |

* cited by examiner

SPECTROGRAPH

FIELD

The present disclosure relates to spectrographs, including, but not limited to spectrographs for performing a spectroscopic measurement or a photometric measurement of a sample.

BACKGROUND INFORMATION

Various spectrographs are available in the marketplace. Known spectrographs generally require sophisticated active alignment. For example, a known spectrograph includes a slit that requires orientation under a microscope, and a diffraction element that requires mounting on an adjustable mount for alignment with the optical path of the spectrograph. Exemplary embodiments of spectrographs described herein provide increased light energy in a desired spectral range or desired spectral ranges, and improved trapping of stray light, resulting in reduced or minimized stray light. In addition, exemplary spectrographs described herein are less susceptible to requiring redundant alignment. In addition, exemplary spectrographs described herein show an enhanced overall performance.

SUMMARY

A spectrograph is disclosed, which, in an exemplary embodiment, includes: a housing that includes a wall having an inner surface facing an interior of the housing, the wall including first, second and third openings; an entrance slit located at the first opening and configured to direct light along a first portion of a light path in the interior of the housing; a dispersive element located at the second opening and configured to receive light from the entrance slit along the first portion of the light path and direct light along a second portion of the light path in the interior of the housing; a detector located at the third opening and configured to receive light from the dispersive element along the second portion of the light path, the detector including a first group of light-sensitive regions and a second group of light-sensitive regions; and a cover being positioned to separate the first group of light-sensitive regions from the light path, the second group of light-sensitive regions being exposed to the light path.

In an alternate exemplary embodiment, a spectrograph is disclosed which includes: a housing that includes a wall having an inner surface facing an interior of the housing, the wall including first, second and third openings, the wall including projections extending inwardly of the second opening; an entrance slit located at the first opening and configured to direct light along a first portion of a light path in the interior of the housing; a dispersive element located at the second opening and configured to receive light from the entrance slit along the first portion of the light path and direct light along a second portion of the light path in the interior of the housing, the dispersive element having a contour dimensioned to contact the projections which extend into the second opening, the projections and the contour of the dispersive element having complementary dimensional parameters and complementary tolerance parameters so that the contour of the dispersive element contacts all of the projections when the dispersive element is at least partially located in the second opening, and so that an orientation of the dispersive element relative to the entrance slit is fixed; and a detector located at the third opening and configured to receive light from the dispersive element along the second portion of the light path.

In an alternate exemplary embodiment, a spectrograph is disclosed which includes: a housing that includes a wall having an inner surface facing an interior of the housing, the wall including first, second and third openings; an entrance slit located at the first opening and configured to direct light along a first portion of a light path in the interior of the housing, the entrance slit including a wedged portion extending along a plane that is angled relative to the inner surface of the housing at the first opening; a dispersive element located at the second opening and configured to receive light from the entrance slit along the first portion of the light path and direct light along a second portion of the light path in the interior of the housing; and a detector located at the third opening and configured to receive light from the dispersive element along the second portion of the light path, the wedged portion being configured to fix the entrance slit at an orientation about the first portion of the light path and relative to the dispersive element.

BRIEF DESCRIPTION OF THE DRAWINGS

Other features and advantages disclosed herein will become more apparent from the following detailed description of exemplary embodiments when read in conjunction with the attached drawings, wherein.

DETAILED DESCRIPTION

Figure 1:
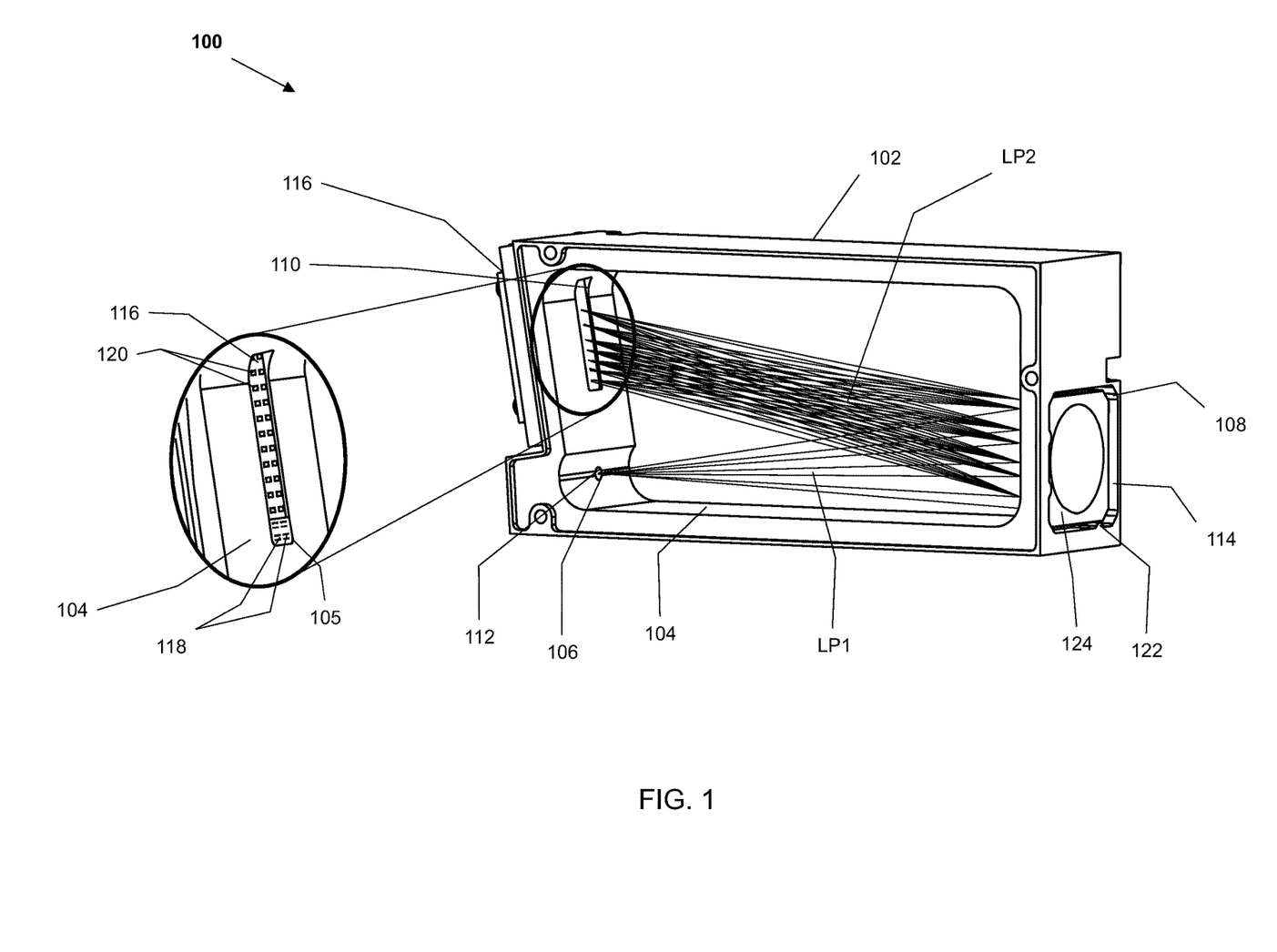
FIG. 1 shows an exemplary embodiment of a spectrograph.
Figure 2:
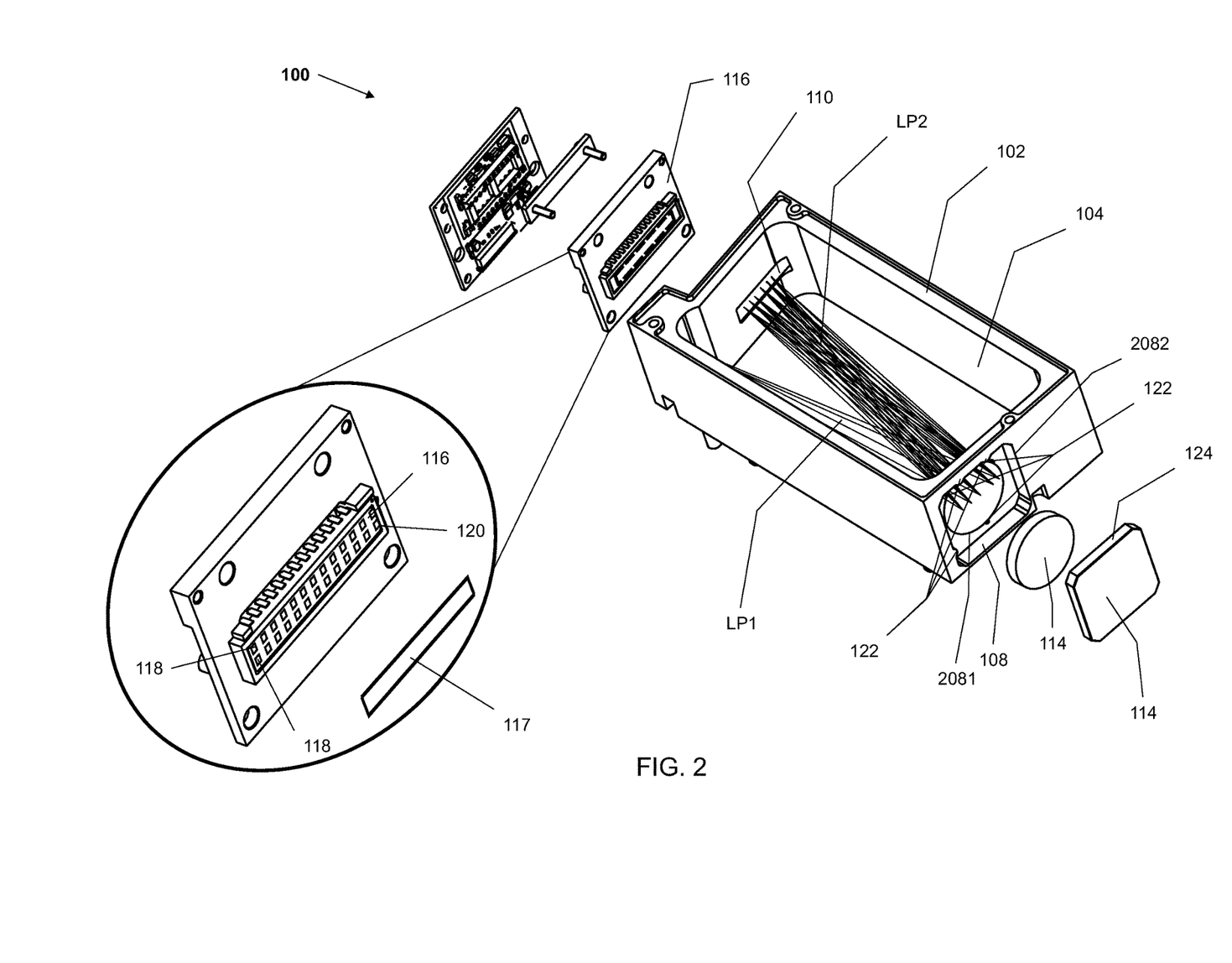
FIG. 2 shows an alternate exemplary embodiment of a spectrograph.
Figure 3:
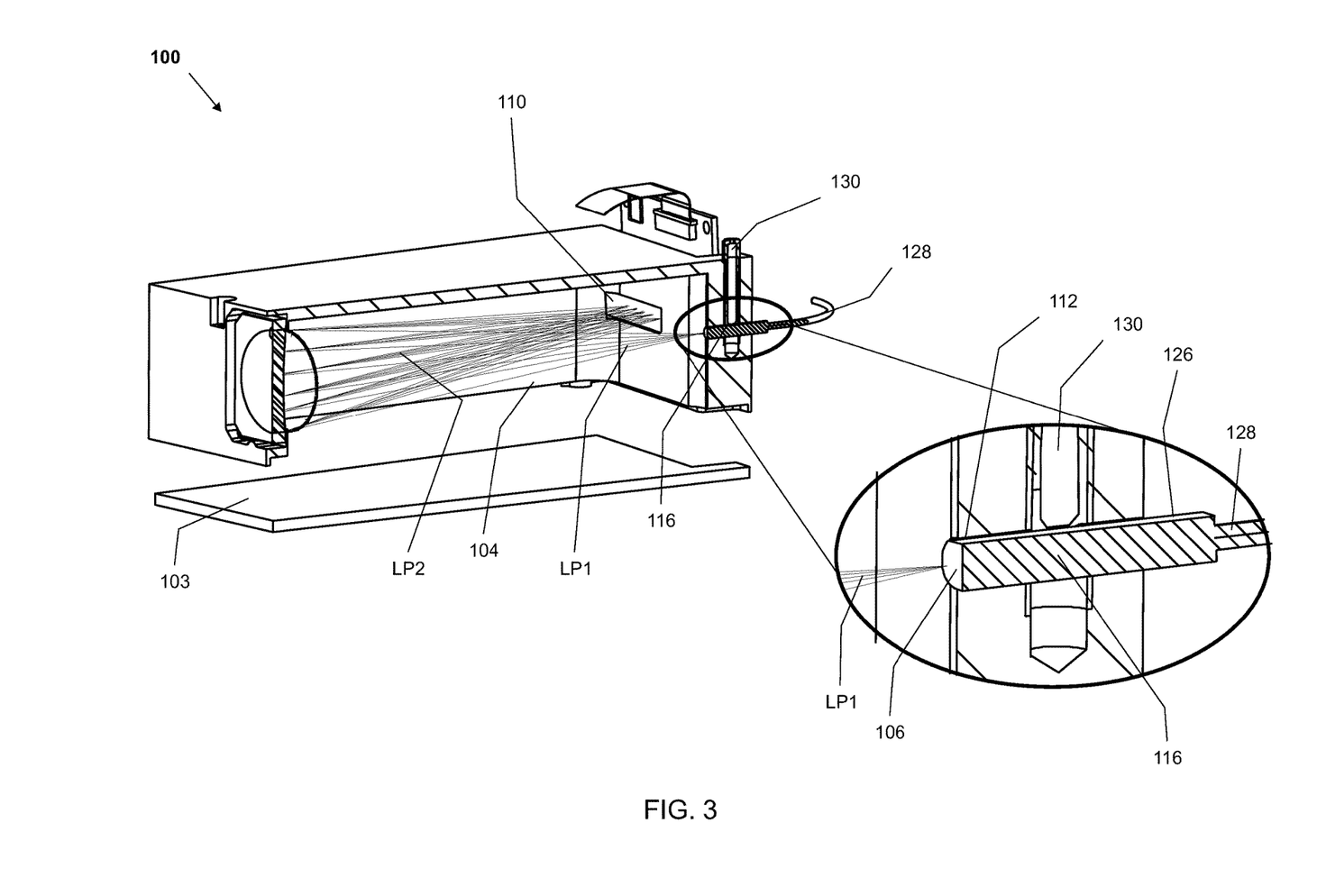
FIG. 3 shows a cross-sectional view of an alternate exemplary embodiment of a spectrograph.

FIGS. 1, 2 and 3 show exemplary embodiments of a spectrograph 100. The spectrograph 100 includes a housing 102 that includes a wall 104 having an inner surface facing an interior of the housing 102. The wall includes a first opening 106, a second opening 108 and a third opening 110. The spectrograph 100 includes an entrance slit 112 located at the first opening 106 and configured to direct light along a first portion LP1 of a light path in the interior of the housing 102. The spectrograph 100 includes a dispersive element 114 located at the second opening 108 and configured to receive light from the entrance slit 112 along the first portion LP1 of the light path and direct light along a second portion LP2 of the light path in the interior of the housing 102. The spectrograph 100 includes a detector 116 located at the third opening 110 and configured to receive light from the dispersive element 114 along the second portion LP2 of the light path.

In an exemplary embodiment of the spectrograph 100, the housing 102 includes a black, anodized material, and/or any other material known in the art or to be developed to block light of a particular spectral range. In an exemplary embodiment, the first and third openings 106, 110 are on the same side of the housing 102, and the second opening 108 is on the opposite side of the housing 102, such that light enters from one side of the housing 102 through the entrance slit 112, is dispersed by the dispersive element 114 on the opposite side of the housing 102, and reaches the detector 116 on the side of the housing 112 on which the entrance slit 112 is located. As shown in FIG. 3, a housing cover 103 is arranged to close the housing 102 and provide a dark environment in the interior of the housing 102.

In an exemplary embodiment of the spectrograph 100, the light directed along the first portion LP1 of the light path by the entrance slit 112 comes from a fiber 128 in optical communication with the entrance slit 112.

In an exemplary embodiment of the spectrograph 100, the dispersive element 114 includes a transmission grating, a grooved grating, a holographic grating and/or a prism, and/or another suitable dispersive element known in the art or to be developed. In an exemplary embodiment, the dispersive element 114 includes a square plate, and an active area that is a concave circular reflective and diffractive surface.

In an exemplary embodiment, the spectrograph 100, a light source and/or any or all optical components between the light source and the detector 116 are configured to operate in the "UV/Vis" (ultraviolet-visible) range. In other exemplary embodiments, the spectrograph 100, a light source and/or any or all optical components between the light source and the detector 116 are configured to operate in either one, or in any combination of the following spectral ranges: UV/Vis, Vis (visible), MIR (mid infrared) and/or NIR (near infrared). For example, the detector 116 and/or the dispersive element 114 can be optimized for any or any combination of these ranges of the electromagnetic spectrum.

In an exemplary embodiment of the spectrograph 100, the entrance slit 112 can be z-aligned, for focus alignment, by adjusting the distance traveled by light from the entrance slit 112 to the detector 116 via the dispersive element 114. The detector 116 can be x/y-aligned, for focal plane alignment, by displacing the detector 116 in the plane of the detector 116. The detector 116 can also be finely aligned manually using screws. The focal alignment on the entrance slit 112 can also be adjusted. The focus of the light can be optimized, to sharpen the light at the detector 116.

In exemplary embodiments described herein, the performance of the spectrograph 100 can be enhanced by reducing or minimizing stray light, by increasing light energy in a desired spectral range or desired spectral ranges, and by adequately trapping stray light. In addition, exemplary embodiments described herein are less susceptible to requiring redundant alignment.

As shown in FIGS. 1 and 2, the detector 116 includes a first group of light-sensitive regions 118 and a second group of light-sensitive regions 120. The spectrograph 100 includes a cover 105 positioned to separate the first group of light-sensitive regions 118 from the light path, the second group of light-sensitive regions 120 being exposed to the light path.

In an exemplary embodiment of the spectrograph 100, the cover 105 blocks a zero-order signal of the light directed along the light path. In exemplary embodiments, this is desirable because, for example, the first-order signal is of interest for a spectroscopic measurement. Because the cover 105 blocks the zero-order signal, no separate light trap is needed, the light can remain focused on the detector 116, and the zero-order light need not be directed toward a light trap and therefore away from the detector 116. Stray light reaching the detector 116 is substantially reduced, and the risk of light leaking through pixel overflowing or scattered light is reduced or eliminated. Use of the cover 105 enables the measurement of dark current to obtain a compensation intensity value, and enables a simultaneous dark current measurement at the same temperature as a sample measurement. This can be desirable because measured light intensity is temperate-sensitive.

In an exemplary embodiment of the spectrograph 100, the cover 105 is oriented so that the zero-order signal is absorbed by the cover 105 so that reduced or no light is reflected back to the dispersive element 114 and/or the entrance slit 112, thus reducing stray light. The detector 116 can be tilted to match a curved focal plane of the light reflected by the dispersive element 114.

In an exemplary embodiment of the spectrograph 100, the detector 116 is one of a charge-coupled device (CCD) array detector, a linear CCD detector, a photo-diode array detector, or a complementary metal-oxide semiconductor (CMOS) detector, and/or another suitable detector known in the art or to be developed.

In an exemplary embodiment of the spectrograph 100, the light-sensitive regions 118 of the first group detect light in a first wavelength range, the light-sensitive regions 120 of the second group detect light in a second wavelength range, and the first and second wavelength ranges are different.

In an exemplary embodiment of the spectrograph 100, the light-sensitive regions 118 of the first group detect light in a first wavelength range, the light-sensitive regions 120 of the second group detect light in a second wavelength range, and the first and second wavelength ranges are non-overlapping.

In an exemplary embodiment, the spectrograph 100 includes a filter 117 arranged in front of the detector 116 such that light traveling along the second portion LP2 of the light path will first traverse the filter 117 and then reach the detector 116. The light-sensitive regions 120 of the second group are exposed to the light path even if the filter 117 is disposed between the light-sensitive regions 120 of the second group and the interior of the housing 112. In an exemplary embodiment, the filter 117 includes any filter known in the art or to be developed that suppresses higher order light from the dispersion element 114. In an exemplary embodiment, the filter 117 is an order sorting filter. In an exemplary embodiment, the filter 117 contacts the detector 116. In an exemplary embodiment, the filter 117 replaces the detector window used in known systems. In other words, the filter 117 is configured to perform the functions of an order sorting filter and a detector window. For example, the filter 117 reduces the likelihood of second or third-order light reaching the detector 116.

In an exemplary embodiment of the spectrograph 100, the cover 105 includes a black, anodized metal plate. Alternatively, the cover 105 can include any other material known in the art or to be developed to block light of a particular spectral range.

In an exemplary embodiment of the spectrograph 100, the cover 105 is integral with the wall 104 of the housing 102. For example, the cover 105 is continuous with and made from the same material as an adjacent portion of the wall 104 of the housing 102.

In an exemplary embodiment of the spectrograph 100, the cover 105 is distinct from the wall 104 of the housing 102. In exemplary embodiments, the cover 105 is coupled to the wall 104 of the housing 102. In other exemplary embodiments, the cover 105 is spaced from the wall 104 of the housing 102.

As shown in FIGS. 1 and 2, the wall 104 includes projections 122 extending inwardly of the second opening 108. The dispersive element 114 has a contour 124 dimensioned to contact the projections 122 which extend into the second opening 108. The projections 122 and the contour 124 of the dispersive element 114 have complementary dimensional parameters and complementary tolerance parameters so that the contour 124 of the dispersive element 114 contacts all of the projections 122 when the dispersive element 114 is at least partially located in the second opening 108, and so that an orientation of the dispersive element 114 relative to the entrance slit 112 is fixed. In an exemplary embodiment of the spectrograph 100, the contour 124 of the dispersive element 114 contacts all of the projections 122 when a force is exerted on the dispersive element 114 in a direction toward the interior of the housing 102.

Complementary dimensional parameters and complementary tolerance parameters are determined during manufacture such that the contour 124 of the dispersive element 114 is configured to contact all of the projections 122 when the dispersive element 114 is at least partially located in the second opening 108, and so that the orientation of the dispersive element 114 is fixed. In other words, to account for the fact that dispersive elements 114 can be uniquely designed for specific applications, the second opening 108 is constructed based on the dimensions and tolerances used to construct the dispersive element 114 to be placed in the second opening 108. As a result, shifts occurring during manufacture of the dispersive element 114 are taken into account when forming the second opening 108 and its projections 122. The configuration of the projections 122 reduces the likelihood of additional alignment being necessary during assembly. In an exemplary embodiment, when a dispersive element 114 is manufactured, the dispersive element 114 is adjusted based on imperfections in the substrate of the dispersive element 114. For example, the dimensions and the centering of the dispersive element 114 are adjusted. In an exemplary embodiment, the second opening 108 of the housing 102 is constructed based on these adjustments.

In an exemplary embodiment of the spectrograph 100, the second opening 108 includes inner and outer openings 2081, 2082. The inner opening 2081 is located closer than the outer opening 2082 to the interior of the housing 102. The projections 122 include a first group of projections 122 extending inwardly of the inner opening 2081 and a second group of projections 122 extending inwardly of the outer opening 2082.

In an exemplary embodiment of the spectrograph 100, at least one of the first group of projections 122 or the second group of projections 122 includes at least three projections 122. In other exemplary embodiments of the spectrograph 100, the first and/or second group of projections 122 can include two projections, or more than three projections. In exemplary embodiments, the projections 122 are configured to reduce the risk of the dispersive element 114 tilting in any direction relative to the second opening 108. In an exemplary embodiment, the projections 122 of the first group are contact spots that include three hemispherical nudges protruding toward the reflective and/or diffractive surface of the dispersive element 114 such that the this surface faces the detector 116 and the slit 112 when positioned in the circular opening 2081.

In an exemplary embodiment of the spectrograph 100, the inner opening 2081 and the outer opening 2082 possess different diameters. In an exemplary embodiment, the inner opening 2081 and the outer opening 2082 possess different shapes.

As shown in FIG. 3, the entrance slit 112 includes a wedged portion 126 extending along a plane that is angled (i.e., inclined by a non-zero angle) relative to the inner surface of the housing 102 at the first opening 106. The wedged portion 126 is configured to fix the entrance slit 112 at an orientation about the first portion LP1 of the light path and relative to the dispersive element 114.

Figure 4A:
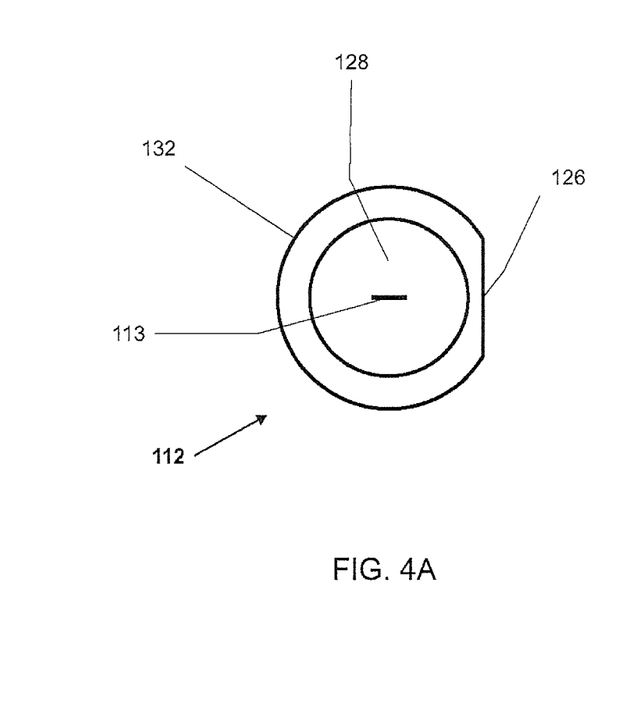
FIGS. 4A-B show alternate exemplary embodiments of an entrance slit.

In an exemplary embodiment of the spectrograph 100, the entrance slit 112 includes a longitudinal gap 113 extending at an angle of 90 degrees to the wedged portion 126, as illustrated in FIG. 4A, which shows an exemplary entrance slit 112 In other exemplary embodiments, the longitudinal gap 113 extends at any other angle relative to the wedged portion 126.

An exemplary embodiment, the spectrograph 100 is combined with an optical fiber 128 that is configured such that light is directed into the spectrograph 100 through the optical fiber 128. The optical fiber 128 is in optical communication with the entrance slit.

An exemplary embodiment of the spectrograph 100 includes a screw 130 positioned against the wedged portion 126 of the entrance slit 112 to fix the entrance slit 112 at a predetermined orientation. The configuration of the entrance slit 112 and its wedged portion 126 reduces the likelihood of additional alignment being necessary during assembly, unlike known entrance slits which are aligned under a microscope.

Figure 4B:
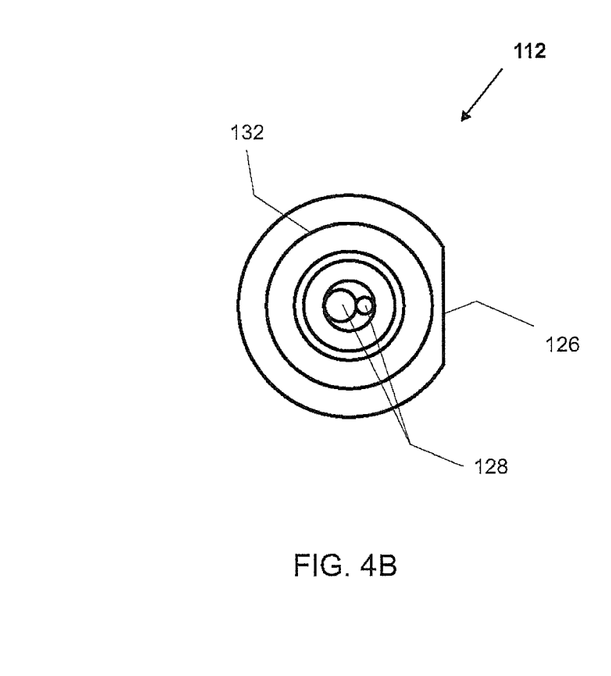

In an exemplary embodiment of the spectrograph 100, the entrance slit 112 includes a flange 132 at a periphery of the entrance slit 112, the wedged portion 126 being a wedged portion of the flange 132.

In an exemplary embodiment, the spectrograph 100 is combined with an optical fiber 128 that is configured such that light is directed into the spectrograph 100 through the optical fiber. The flange 132 includes a tubular member housing the optical fiber 128 in optical communication with the entrance slit 112. In an exemplary embodiment, the tubular member is a ferrule.

FIG. 4B shows an exemplary embodiment of an entrance slit 112. A flange 132 of the slit 112 houses two fibers 128. The fibers 128 are adjacent to one another and are aligned in a direction perpendicular to the wedged portion 126. In other exemplary embodiments, the longitudinal gap 113 extends at any other angle relative to the wedged portion 126.

Figure 5:
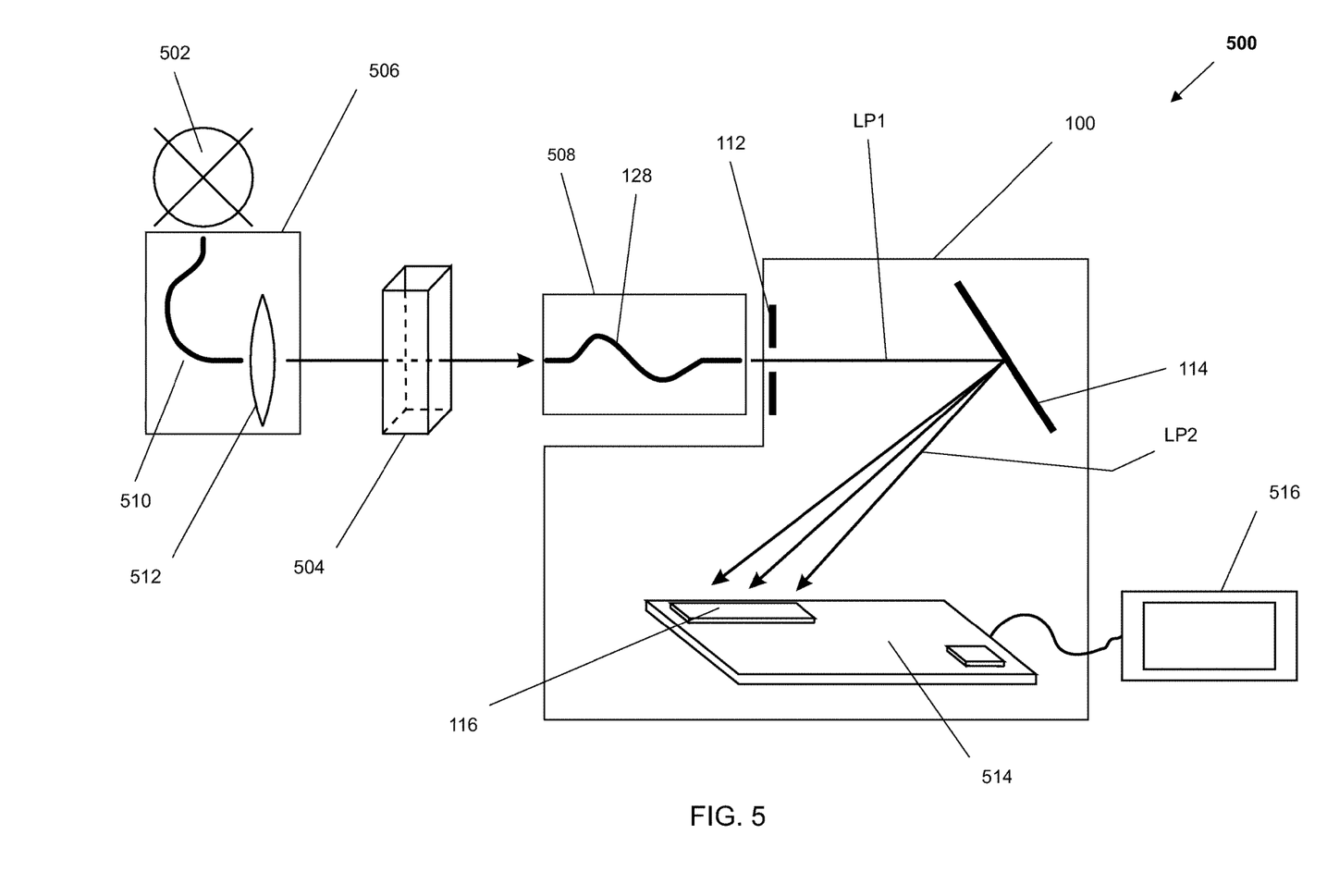
FIG. 5 shows an exemplary embodiment of a spectrometer.

FIG. 5 shows an exemplary embodiment of a spectrometer 500, which includes a spectrograph 100, an illumination system 502; a measurement area 504 configured to hold a sample or sample carrier; first optical elements 506 configured to direct light from the light source 102 to the measurement area 504; second optical elements 508 configured to direct light from the measurement area 504 to the entrance slit 112. The first optical elements 506 include a first optical fiber, such as a glass fiber 510.

In exemplary embodiments, the first optical elements 506 are configured such that light in a portion of the light path between the light source 502 and the second optical elements 508 is directed so as to propagate through a sample without being blocked by other components of the spectrometer and so as to be collected by the optical fiber 128. In an exemplary embodiment, the light is focused on or within the sample. In an exemplary embodiment, the light is substantially collimated between the first and second optical elements. In an exemplary embodiment, the optical characteristics of the glass fiber 510, optionally in combination with a collimator lens 512 (and/or a collimator minor) at the end of the glass fiber 510, ensure that the beam is directed so as to propagate through a sample without being blocked by other components of the spectrometer and so as to be collected by the optical fiber 128, focused on or within the sample, or substantially collimated between the first and second optical elements. A spectrometer constructed with glass fibers can be built more compact than known benchtop spectrometers.

The second optical elements 508 include a second optical fiber such as a glass fiber 128. In exemplary embodiments the first and second optical elements 506 and 508 include optical elements such as lenses and mirrors to transmit the light along the light path from the light source 502 to the detector 116. In an exemplary embodiment, a lens focuses collimated light onto the glass fiber 128. In exemplary embodiments, all optical elements in the light path, including for example the light source 502, the first and second optical elements 506 and 508, the glass fibers 510 and 128, the filter 117 (not shown in FIG. 5), and the detector 116, are optimized for a particular spectral range. In an exemplary embodiment, the detector 116 is disposed on a sensor chip 514 that includes a processor and non-transitory computer-readable memory and that is connected to a display 516 or via a computer for further processing to a display 516.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A spectrograph comprising:
a housing that includes a wall having an inner surface facing an interior of the housing, the wall including first, second and third openings;
an entrance slit located at the first opening and configured to direct light along a first portion of a light path in the interior of the housing;
a dispersive element located at the second opening and configured to receive light from the entrance slit along the first portion of the light path and direct light along a second portion of the light path in the interior of the housing;
a detector located at the third opening and configured to receive light from the dispersive element along the second portion of the light path, the detector including a first group of light-sensitive regions and a second group of light-sensitive regions; and
a cover being positioned to separate the first group of light-sensitive regions from the light path, the second group of light-sensitive regions being exposed to the light path.

2. The spectrograph of claim 1, wherein the detector is one of a charge-coupled device array detector, a linear charge-coupled device detector, a photo-diode array detector, or a complementary metal-oxide semiconductor detector.

3. The spectrograph of claim 1, wherein the light-sensitive regions of the first group detect light in a first wavelength range and the light-sensitive regions of the second group detect light in a second wavelength range, the first and second wavelength ranges being different.

4. The spectrograph of claim 1, wherein the light-sensitive regions of the first group detect light in a first wavelength range and the light-sensitive regions of the second group detect light in a second wavelength range, the first and second wavelength ranges being non-overlapping.

5. The spectrograph of claim 1, comprising:
a filter arranged in front of the detector such that light traveling along the second portion of the light path will first traverse the filter and then reach the detector.

6. The spectrograph of claim 1, wherein the cover is integral with the wall of the housing.

7. The spectrograph of claim 1, wherein the cover is distinct from the wall of the housing.

8. A spectrometer comprising:
the spectrograph of claim 1;
a light source;
a measurement area configured to hold a sample or sample carrier;
first optical elements configured to direct light from the light source to the measurement area; and
second optical elements configured to direct light from the measurement area to the entrance slit of the spectrograph.

9. A spectrograph comprising:
a housing that includes a wall having an inner surface facing an interior of the housing, the wall including first, second and third openings, the wall including projections extending inwardly of the second opening;
an entrance slit located at the first opening and configured to direct light along a first portion of a light path in the interior of the housing;
a dispersive element located at the second opening and configured to receive light from the entrance slit along the first portion of the light path and direct light along a second portion of the light path in the interior of the housing, the dispersive element having a contour dimensioned to contact the projections which extend into the second opening, the projections and the contour of the dispersive element having complementary dimensional parameters and complementary tolerance parameters so that the contour of the dispersive element contacts all of the projections when the dispersive element is at least partially located in the second opening, and so that an orientation of the dispersive element relative to the entrance slit is fixed; and
a detector located at the third opening and configured to receive light from the dispersive element along the second portion of the light path.

10. The spectrograph of claim 9, wherein the second opening includes inner and outer openings, the inner opening being located closer than the outer opening to the interior of the housing, the projections including a first group of projections extending inwardly of the inner opening and a second group of projections extending inwardly of the outer opening.

11. The spectrograph of claim 10, wherein at least one of the first group of projections or the second group of projections includes at least three projections.

12. The spectrograph of claim 10, wherein the inner opening and the outer opening possess different diameters.

13. A spectrometer comprising:
the spectrograph of claim 9;
a light source;
a measurement area configured to hold a sample or sample carrier;
first optical elements configured to direct light from the light source to the measurement area; and
second optical elements configured to direct light from the measurement area to the entrance slit of the spectrograph.

14. A spectrograph comprising:

a housing that includes a wall having an inner surface facing an interior of the housing, the wall including first, second and third openings;

an entrance slit located at the first opening and configured to direct light along a first portion of a light path in the interior of the housing, the entrance slit including a wedged portion extending along a plane that is angled relative to the inner surface of the housing at the first opening;

a dispersive element located at the second opening and configured to receive light from the entrance slit along the first portion of the light path and direct light along a second portion of the light path in the interior of the housing; and a detector located at the third opening and configured to receive light from the dispersive element along the second portion of the light path, the wedged portion being configured to fix the entrance slit at an orientation about the first portion of the light path and relative to the dispersive element.

15. The spectrograph of claim 14, wherein the entrance slit includes a longitudinal gap extending at an angle of 90 degrees to the wedged portion.

16. The spectrograph of claim 14 in combination with an optical fiber that is configured such that light is directed into the spectrograph through the optical fiber, the fiber being in optical communication with the entrance slit.

17. The spectrograph of claim 14, comprising:
a screw positioned against the wedged portion of the entrance slit to fix the entrance slit at a predetermined orientation.

18. The spectrograph of claim 17, wherein the entrance slit includes a flange at a periphery of the entrance slit, the wedged portion being a wedged portion of the flange.

19. The spectrograph of claim 18 in combination with an optical fiber that is configured such that light is directed into the spectrograph through the optical fiber, wherein the flange includes a tubular member housing the optical fiber in optical communication with the entrance slit.

20. A spectrometer comprising:
the spectrograph of claim 14;
a light source;
a measurement area configured to hold a sample or sample carrier;
first optical elements configured to direct light from the light source to the measurement area; and
second optical elements configured to direct light from the measurement area to the entrance slit of the spectrograph.

* * * * *

UNITED STATES PATENT AND TRADEMARK OFFICE
CERTIFICATE OF CORRECTION

PATENT NO. : 9,863,809 B2
APPLICATION NO. : 14/840537
DATED : January 9, 2018
INVENTOR(S) : Chun-Hung Kuo et al.

Page 1 of 1

It is certified that error appears in the above-identified patent and that said Letters Patent is hereby corrected as shown below:

In the Specification

In Column 6, Line 62, "a collimator minor" should read -- a collimator mirror --.
In Column 7, Line 7, "lenses and minors" should read -- lenses and mirrors --.

Signed and Sealed this
Thirty-first Day of July, 2018

Andrei Iancu
*Director of the United States Patent and Trademark Office*